(12) United States Patent
Wang et al.

(10) Patent No.: US 10,037,502 B2
(45) Date of Patent: Jul. 31, 2018

(54) MAINTENANCE SCHEDULE OPTIMIZATION METHOD FOR ELECTRIC POWER SYSTEM INCLUDING LARGE-SCALE WIND POWER

(71) Applicants: STATE GRID CORPORATION OF CHINA, Beijing (CN); STATE GRID GANSU ELECTRIC POWER CORPORATION, Lanzhou, Gansu Province (CN); GANSU ELECTRIC POWER CORPORATION WIND POWER TECHNOLOGY CENTER, Lanzhou, Gansu Province (CN)

(72) Inventors: Ningbo Wang, Lanzhou (CN); Ming Ma, Lanzhou (CN); Yanhong Ma, Lanzhou (CN); Guangtu Liu, Lanzhou (CN); Long Zhao, Lanzhou (CN); Qiang Zhou, Lanzhou (CN); Dingmei Wang, Lanzhou (CN); Liang Lu, Lanzhou (CN); Jianmei Zhang, Lanzhou (CN); Qingquan Lv, Lanzhou (CN)

(73) Assignees: GANSU ELECTRIC POWER CORPORATION WIND POWER TECHNOLOGY CENTER, Gansu Province (CN); STATE GRID GANSU ELETRIC POWER CORPORATION, Gansu Province (CN); STATE GRID CORPORATION OF CHINA, Beijing (CN)

( * ) Notice: Subject to any disclaimer, the term of this patent is extended or adjusted under 35 U.S.C. 154(b) by 513 days.

(21) Appl. No.: 14/648,249

(22) PCT Filed: Apr. 2, 2014

(86) PCT No.: PCT/CN2014/000360
§ 371 (c)(1),
(2) Date: May 28, 2015

(87) PCT Pub. No.: WO2014/176929
PCT Pub. Date: Nov. 6, 2014

(65) Prior Publication Data
US 2015/0302332 A1    Oct. 22, 2015

(30) Foreign Application Priority Data

May 3, 2013    (CN) .......................... 2013 1 0160247

(51) Int. Cl.
*G06Q 10/06*       (2012.01)
*G06Q 50/06*       (2012.01)
(Continued)

(52) U.S. Cl.
CPC ....... *G06Q 10/06312* (2013.01); *F03D 80/50* (2016.05); *G06Q 10/20* (2013.01);
(Continued)

(58) Field of Classification Search
CPC ...................................................... G06Q 10/06
See application file for complete search history.

(56) References Cited

U.S. PATENT DOCUMENTS

| | | | |
|---|---|---|---|
| 2012/0130556 A1* | 5/2012 | Marhoefer | H02J 3/32 700/291 |
| 2012/0144828 A1* | 6/2012 | Lazaris | H02J 3/383 60/641.1 |

(Continued)

FOREIGN PATENT DOCUMENTS

| | | |
|---|---|---|
| CN | 102738833 A | 10/2012 |
| CN | 102780219 A | 11/2012 |

(Continued)

*Primary Examiner* — Kurtis Gills
(74) *Attorney, Agent, or Firm* — Jiwen Chen

(57) ABSTRACT

The present invention discloses a maintenance schedule optimization method for an electric power system including
(Continued)

large-scale wind power to build objective function to make it get optimal results, then constrain the objective function, constraint conditions include: constrain according to maintenance natural environment; constrain according to maintenance time of wind power plant; constrain according to maintenance site of wind power plant; constrain according to system reliability at wind power plant; constrain according to maintenance continuity of generator unit. Under the above constraint conditions, the electric power system is modeled with heuristic algorithm according to the above objective function. Through modeling the electric power system including large-scale wind power, optimize maintenance time of wind turbines in electric power system through modeling under a certain constraint conditions to maintain the wind power equipment properly while ensuring maximum efficiency of wind power generation at the same time.

2 Claims, 1 Drawing Sheet

(51) Int. Cl.
*G06Q 10/00* (2012.01)
*F03D 80/50* (2016.01)

(52) U.S. Cl.
CPC .......... *G06Q 50/06* (2013.01); *F05B 2270/20* (2013.01); *Y02E 10/72* (2013.01); *Y02E 40/76* (2013.01); *Y04S 10/54* (2013.01); *Y04S 10/545* (2013.01)

(56) References Cited

U.S. PATENT DOCUMENTS

| | | | |
|---|---|---|---|
| 2012/0150361 A1* | 6/2012 | Lazaris | H02J 3/382 700/297 |
| 2012/0150679 A1* | 6/2012 | Lazaris | G06Q 30/0605 705/26.2 |
| 2013/0268131 A1* | 10/2013 | Venayagamoorthy | G05F 5/00 700/286 |

FOREIGN PATENT DOCUMENTS

| | | | | |
|---|---|---|---|---|
| CN | 103259262 A | * | 8/2013 | ............ G06Q 50/06 |
| CN | 103259262 A | | 8/2013 | |
| JP | 2004015890 A | | 1/2004 | |
| JP | 2009195023 A | | 8/2009 | |
| JP | 2010068704 A | | 3/2010 | |

* cited by examiner

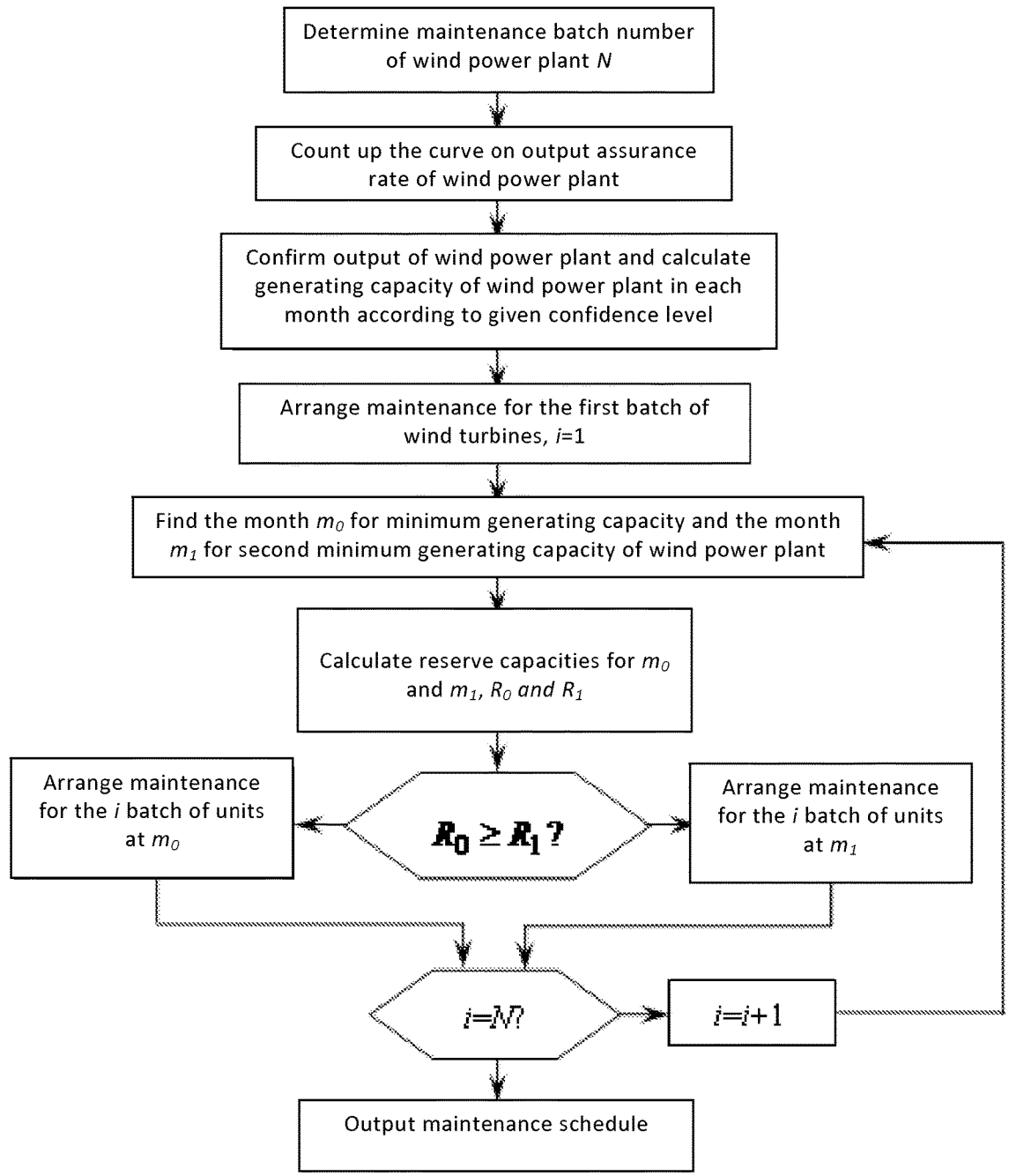

MAINTENANCE SCHEDULE OPTIMIZATION METHOD FOR ELECTRIC POWER SYSTEM INCLUDING LARGE-SCALE WIND POWER

This is a U.S. national stage application of PCT Application No. PCT/CN2014/000360 under 35 U.S.C. 371, filed Apr. 2, 2014 in Chinese, claiming the priority benefit of Chinese Application No. 201310160247.5, filed May 3, 2013, which is hereby incorporated by reference.

TECHNICAL FIELD

The present invention relates to the field of wind power plant maintenance, involving a maintenance schedule optimization method for electric power system including large-scale wind power.

BACKGROUND TECHNOLOGY

At present, conventional units of thermal power and hydropower have reliable power generating capacity and good power regulating capacity. Thus, during inspection and maintenance, the effect of these units have on the power gird is mainly shown in the aspect of the reliability of power supply. While arranging maintenance of conventional units, it is usually necessary to consider and guarantee the reliability of power supply of the grid. The corresponding methods include equal reserve, equal risk degree, etc. Compared with conventional units of thermal power and hydropower, wind turbine power generating unit is special. Thus, the effect of wind turbine power generating unit has on the power grid is different from the effect of conventional generator units have on the grid.

A wind power plant is generally characterized in that it has many wind turbines, each single turbine has a small capacity and wind farms are geographically widely spread. Limited by maintenance manpower and material resources, the entire wind power plant cannot be stopped during maintenance of the wind power plant. Usually, maintenance is conducted in batches according to geographical distribution of wind turbines. With this maintenance method, the number of the turbines arranged to be maintained is limited in number for each time and as capacity of a single wind turbine is small, its controllability is bad and confidence level of its capacity is not very high. As it is shown in operating conditions of Gansu Wind Farm in 2011, wind power output of the entire grid mainly concentrates on the installed capacity output of 5%~35%, frequency of occurrence is 43%. The temporal frequency for installed capacity of 0%~5% is 30% and temporal frequency for installed capacity of over 65% is 6%. It can be seen that capacity replacement benefit of wind turbines is limited during maintenance of each time and its influence on reliability of grid power supply is not as serious as conventional thermoelectric units and hydroelectric generating units. Therefore, when one makes maintenance schedule for a wind power plant, the effect on reliability of electric power system takes a second place.

As wind power is a green and renewable energy source. One of its vital functions in power grid is replacing conventional fossil energy to generate electricity in order to reduce emission of greenhouse gases and harmful gases, so as to reduce the consumption of conventional fossil energy and improve energy saving and emission reduction of the power grid. Economically, wind power plant maintenance mainly affects its energy saving and emission reduction. As generation of electrical energy at wind power plant varies in seasons, it needs to focus on how to reduce wind curtailment quantity of wind power plant maintenance while formulating maintenance schedule, so as to take full advantage of wind power resources, which have the benefits of energy saving and emission reduction of the power grid.

Formulating maintenance schedule for generating units is not only important for operation and dispatching of electric power system, but also important for long-term planning of electric power system. Formulating maintenance schedule for generating units is to make preventative maintenance on generating units to keep them in good technical conditions, reduce failure, prolong their service life and improve reliability of the overall electric power system.

The planned maintenance items for wind power plant generally include: lubricating, tightening screws, replacing filters, checking safeguard measures, etc. At present, most of foreign wind power plants adopt planned maintenance. For example, Sweden Vattenfall generally makes planned maintenance on its wind power plants once every two years, which is divided into overhaul and line check as overhaul needs about two maintenance workers to work for seven labor hours and line check needs about two maintenance workers to work for four labor hours; Denmark Elsam electric power company makes maintenance on small and old wind turbines once every 3~6 months and the maintenance on large and new wind turbines will be made every half to one year, as it takes about two maintenance workers to work about fifteen hours for each wind turbine.

Wind power plant maintenance is an important part in operating maintenance of wind power plant and compared with conventional power supplies like thermal power and hydropower, wind power plant is of the characteristics like wind power plants are widely distributed geographically, units are large in number, natural environmental is complex and changeable and seasonal variation of wind power output is large, which make the wind power plant cannot ensure generating efficiency during maintenance.

SUMMARY OF THE INVENTION

For the above issues, the present invention is to put forward a maintenance schedule optimization method for a wind power system including large-scale wind power to make proper maintenance on wind power equipment while ensuring maximum efficiency of wind power generation.

In order to realize the above purpose, technical solution adopted in the present invention refers to:
a maintenance schedule optimization method for an electric power system including large-scale wind power characterized in building an objective function, which is:

$$C_{Km} = C_m - L_{m \cdot max} - R_{Rm} - R_{Sm},$$

and minimum wind curtailment electric quantity of wind power in a common year is:

$$\min\left\{E_{WMQ} \left| \min\left\{\frac{1}{12}\sum_{m=1}^{12}\left[C_{Km} - \frac{1}{12}\sum_{m=1}^{12}C_{Km}\right]^2\right\}\right.\right\};$$

in the above function: $C_{Km}$ is spare capacity of an electric power system of the m month in a common year; $C_m$ is available generating capacity of an electric power system after deducting unit maintenance capacity of the m month in a common year; $L_{m \cdot max}$ is the maximum load of electric power system on maximum load day of the m month in a common year; $R_{Rm}$ and $R_{Sm}$ refer to spinning reserve capacity and shutdown reserve capacity of an electric power system of the m month in a common year; $E_{WMQ}$ is unused electric quantity of wind turbine maintenance;

In order to obtain the optimal results for the above objective function, several constrains are imposed on the objective function. The constraint conditions include: constrain according to maintenance natural environment; constrain according to maintenance time of the wind power plant; constrain according to maintenance site of the wind power plant; constrain according to system reliability at the wind power plant; constrain according to maintenance continuity of generator units;

Under the above constraint conditions, modeling the electric power system with heuristic algorithm according to the above objective function.

Pursuant to optimized implementation case of the present invention, constraint on the maintenance time for a wind power plant refers to:

$$30\sum_{m=0}^{11} n_{Mim} = N_{WRi}D_{Wi};$$

Constraint on maintenance site of a wind power plant refers to:

$$n_{WRim} \leq \bar{n}_{Mi} \leq N_{Wim};$$

Constraint on reliability of a wind power system refers to:

$$R_m \geq R_{min}$$

Constraint on maintenance continuity of generator units refers that the units, maintenance time of which exceeds one month should be maintained in next successive month;

In the above formula, "i" represents a wind power plant and $N_{WRim}$ is number of the units in the wind power plant "i" that have to be maintained in a common year; $N_{Wim}$ is number of machines of a wind power plant "i" of the m month in a common year; $\bar{n}_{Mi}$ and $n_{WRim}$ refer to the constrained number of units arranged to be maintained and number of the actually maintained units of the wind power plant "i" in the m month; $D_{Wi}$ is the average days needed to maintain each generator unit of a wind power plant "i" of the m month in a common year; Rm is the spinning reserve capacity of an electric power system of the m month in a common year; Rmin is the minimum requirement for spinning reserve capacity of an electric power system in a common year.

Pursuant to optimal implementation cases of the present invention, an electric power system is modeled with heuristic algorithm according to the above objective function. Modeling steps are as follows:

Step 1: dividing all the wind turbines into N batches for maintenance according to the number of machines, geographical distribution and conditions about manpower and material resources at a wind power plant;

Step 2: counting the curve on an output assurance rate of a wind power plant in each month all the year round according to output historical data all the year round of the wind power plant;

Step 3: calculating generating capacity of the wind power plant in each month all the year round according to confidence level of the wind power output of the wind power plant;

Step 4: finding the month for minimum generating capacity and the month for second minimum generating capacity according to generating capacity of the wind power plant in each month all the year round, recorded as m0 and m1;

Step 5: calculating reserve power capacity R0 and R1 in the above m0 and m1;

Step 6: if the above R0≥R1, it represents that power supply of the electric power system in m0 is more reliable, so that a batch of wind turbines needs to be arranged to be maintained in this month;

Step 7: if R0<R1, comparing overall technique-economy of the electric power system, selecting the month that is of a good technique-economy to maintain the units;

Step 8: if maintenance of all the wind turbines has been arranged, outputting the result of maintenance schedule. Otherwise, turning to Step 4 and keep maintaining until the maintenance is completed.

Technical solution of the present invention is of the following beneficial effects:

For the technical solution of the present invention, through modeling the electric power system including a large-scale wind power, optimizing maintenance time of the wind turbines in the electric power system through modeling under a certain constraint conditions to maintain the wind power equipment properly while ensuring maximum efficiency of wind power generation at the same time.

With attached drawings and implementation cases, technical solution of this invention will be further illustrated in details below.

BRIEF DESCRIPTION OF THE DRAWINGS

FIG. 1 is a flow chart for modeling steps in the maintenance schedule optimization method of an electric power system including large-scale wind power illustrated in the implementation embodiment of the present invention.

EMBODIMENTS OF THE INVENTION

With reference to the attached drawings, preferred embodiments of the present invention are illustrated below. It should be noted that the following prefer embodiments are only used to illustrate and explain, but not to limit, the present invention.

A maintenance schedule optimization method for an electric power system including large-scale wind power, characterized by building an objective function, which could be expressed as:

$$C_{Km} = C_m - L_{m \cdot max} - R_{Rm} - R_{Rm} - R_{Sm},$$

minimum wind curtailment electric quantity of wind power in a common year is:

$$\min\left\{E_{WMQ} \left| \min\left\{\frac{1}{12}\sum_{m=1}^{12}\left[C_{Km} - \frac{1}{12}\sum_{m=1}^{12} C_{Km}\right]^2\right\}\right.\right\};$$

In the above function: $C_{Km}$ is spare capacity of the electric power system of the m month in a common year; $C_m$ is available generating capacity of the electric power system after deducting unit maintenance capacity of the m month in a common year; $L_{m \cdot max}$ is the maximum load of the electric power system on the maximum load day of the m month in a common year; $R_{Rm}$ and $R_{Sm}$ refer to spinning reserve capacity and shutdown reserve capacity of the electric power system of the m month in a common year; $E_{WMQ}$ is unused electric quantity of wind turbine maintenance;

In order to obtain the optimal results from the above objective function, constrain conditions are imposed on the objective function, constraint conditions include: constrain according to maintenance natural environment (maintenance will not be arranged when the environment is poor, such as January in winter and July in summer, etc); constrain according to maintenance time of the wind power plant; constrain according to maintenance site of the wind power plant; constrain according to system reliability at the wind power plant; constrain according to maintenance continuity of generator units;

Under the constraint conditions, modelling the electric power system with heuristic algorithm according to the above objective function.

Wherein, constraint on maintenance time for wind power plant refers to:

$$30\sum_{m=0}^{11} n_{Mim} = N_{WRi}D_{Wi};$$

Constraint on maintenance site of the wind power plant refers to:

$$n_{WRim} \leq \bar{n}_{Mi} \leq N_{Wim};$$

Constraint on reliability of the wind power system refers to:

$$R_m \geq R_{min}$$

Constraint on maintenance continuity of generator units refers that the units, maintenance time of which exceeds one month should be maintained in next successive month;

In the above formula, "i" represents the wind power plant and $N_{WRim}$ is number of the units in wind power plant "i" that have to be maintained in a common year; $N_{Wim}$ is the number of units of the wind power plant "i" of the m month in a common year; $\bar{n}_{Mi}$ and $n_{WRim}$ refer to the constrained number of units arranged to be maintained and number of the actually maintained units of the wind power plant "i" in the m month; $D_{Wi}$ is the average days needed to maintain each generator unit of the wind power plant "i" of the m month in a common year; Rm is the spinning reserve capacity of the electric power system of the m month in a common year; Rmin is the minimum requirement for spinning reserve capacity of the electric power system in a common year.

An electric power system is modeled with heuristic algorithm according to the above objective function, steps of which are as follows:

Step 1: dividing all the wind turbines into N batches for maintenance according to numbers of units, geographical distribution and conditions about manpower and material resources at a wind power plant;

Step 2: counting the curve on output assurance rate of the wind power plant in each month all the year round according to output historical data all the year round of the wind power plant;

Step 3: calculating generating capacity of the wind power plant in each month all the year round according to confidence level of wind power output of the wind power plant;

Step 4: finding the month for minimum generating capacity and the month for second minimum generating capacity according to generating capacity of the wind power plant in each month all the year round, recorded as m0 and m1;

Step 5: calculating reserve power capacity R0 and R1 in the above m0 and m1;

Step 6: if the above R0≥R1, it represents that power supply of the electric power system in m0 is more reliable, so that a batch of wind turbines needs to be arranged to be maintained in that month;

Step 7: if R0<R1, comparing overall technique-economy of electric power system, select the month that is of a good technique-economy to maintain the units. Although maintenance in m1 might generate more wind curtailment electric quantity than in m0, it is beneficial for improving the overall reliability of the electric power system, so that it needs to compare overall technique-economy of the electric power system so as to select the month that is of a good technique-economy to maintain the units;

Step 8: if maintenance of all the wind turbines has been arranged, outputting the result of maintenance schedule. Otherwise, turning to Step 4 and keep maintaining until the maintenance is completed.

It should be noted that: the above is only preferred embodiment of the present invention, which is not confined by the above examples. Although the present invention has been illustrated in details referring to the above implementation embodiment, technicians of this field still could modify the technical solution recorded in the above implementation embodiment or replace a part of its technological characteristics. Any modification, replacement and improvement made based on the spirit and principle of the present invention are involved in protection scope of the present invention.

The invention claimed is:

1. A method of conducting maintenance to an electric power system with a large-scale wind power plant based on an optimized maintenance schedule that ensures maximum efficiency of wind power generation, the method consisting of the steps of:

building an objective function by using a computer processor;

modelling the electric power system with heuristic algorithm according to the objective function by using the computer processor and received input information on number of wind turbines, geographical distribution, conditions about manpower and material resources, and historical year round power output data of the wind power plant;

outputting the optimized maintenance schedule to an output device; and conducting maintenance according to the optimized maintenance schedule;

wherein the objective function is:

$$C_{Km} = C_m - L_{m \cdot max} - R_{Rm} - R_{Sm},$$

minimum wind curtailment electric quantity of wind power in a common year is:

$$\min\left\{E_{WMQ} \middle| \min\left\{\frac{1}{12}\sum_{m=1}^{12}\left[C_{Km} - \frac{1}{12}\sum_{m=1}^{12}C_{Km}\right]^2\right\}\right\};$$

wherein: $C_{Km}$ is spare capacity of the electric power system of the m month in a common year; $C_m$ is available generating capacity of the electric power system after deducting unit maintenance capacity of the m month in common year; $L_{m \cdot max}$ is the maximum load of the electric power system on maximum load day of the m month in the common year; $R_{Rm}$ and $R_{Sm}$ refer to spinning reserve capacity and shutdown reserve capacity of the electric power system of the m month in common year; $E_{WMQ}$ is unused electric quantity of wind turbine maintenance;

in order to obtain optimal results, constrains conditions are imposed to the objective function, the constraint conditions comprise: constrain conditions according to maintenance natural environment; constrain according to maintenance time of the wind power plant; constrain conditions according to maintenance site of the wind power plant; constrain conditions according to system reliability at the wind power plant; constrain conditions according to maintenance continuity of generator units;

under the above constraint conditions, modelling the electric power system with heuristic algorithm according to the objective function;

wherein the constraint conditions on maintenance time for wind power plant are:

$$30 \sum_{m=0}^{11} n_{Mim} = N_{WRi} D_{Wi};$$

wherein, the constraint on maintenance site of the wind power plant refers to:

$$n_{WRim} \leq \bar{n}_{Mi} \leq N_{Wim};$$

the constraint conditions on reliability of the wind power system refers to:

$$R_m \geq R_{min}$$

the constraint conditions on maintenance continuity of generator units refers that the units, maintenance time of which exceeds one month should be maintained in next successive month;

in the above formula, "i" represents the wind power plant and $N_{WRim}$ is number of the units in the wind power plant "i" that have to be maintained in a common year; $N_{Wim}$ is count of machine of the wind power plant "i" of the m month in a common year; $\bar{n}_{Mi}$ and $n_{WRim}$ refer to the constrained number of units arranged to be maintained and number of the actually maintained units of the wind power plant "i" in the m month; $D_{Wi}$ is the average days needed to maintain each generator unit of the wind power plant "i" of the m month in a common year; Rm is the spinning reserve capacity of the electric power system of the m month in a common year; Rmin is the minimum requirement for spinning reserve capacity of the electric power system in a common year; and wherein the modeling steps are as follows:

step 1: dividing all wind turbines into N batches for maintenance according to the number of the wind turbines, geographical distribution and conditions about manpower and material resources at the wind power plant;

step 2: drawing a curve on output assurance rate of the wind power plant in each month all the year round according to output historical data all the year round of the wind power plant;

step 3: calculating generating capacity of the wind power plant in each month all the year round according to confidence level of wind power output of the wind power plant;

step 4: finding the month for minimum generating capacity and the month for second minimum generating capacity according to generating capacity of the wind power plant in each month all the year round, recorded as m0 and m1;

step 5: calculating reserve power capacity R0 and R1 in the above m0 and m1;

step 6: if the above R0≥R1, it means that power supply of the electric power system in m0 is more reliable, so that a batch of wind turbines needs to be arranged to be maintained in this month;

step 7: if R0<R1, comparing overall technique-economy of the electric power system, selecting the month that is of a good technique-economy to maintain the units;

step 8: if maintenance of all the wind turbines has been arranged, outputting the result of maintenance schedule, otherwise turning to step 4 and keeping maintaining until the maintenance is completed.

2. The method according to claim 1, wherein the maintenance conducted according to the optimized maintenance schedule includes lubricating, tightening screws, replacing filters, and checking safeguard measures.

* * * * *